(12) United States Patent
Huang

(10) Patent No.: US 8,780,283 B2
(45) Date of Patent: Jul. 15, 2014

(54) PROJECTION DEVICE

(75) Inventor: Yung-Lun Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 82 days.

(21) Appl. No.: 13/534,208

(22) Filed: Jun. 27, 2012

(65) Prior Publication Data

US 2013/0242208 A1 Sep. 19, 2013

(30) Foreign Application Priority Data

Mar. 15, 2012 (TW) .............................. 101108765 A

(51) Int. Cl.
*G02F 1/13357* (2006.01)

(52) U.S. Cl.
USPC ................................................. 349/5; 349/62

(58) Field of Classification Search
CPC ..... H04N 9/31; H04N 9/3197; H04N 9/3164; H04N 5/7408; H04N 9/3152; H04N 9/3141; H04N 5/74; G02B 6/00; G02B 5/10; G02B 19/0066; G02B 6/0031; G02B 6/0053; G02B 6/0028; G02B 6/0043; G02B 6/0068; G02B 6/0073; G02B 19/0028; G02B 19/0047; G02B 5/045; G02B 27/0856; G02B 3/08; G02B 3/0062; G02B 27/0955; G02B 27/0966; G02F 1/1333; G02F 1/1335; G02F 1/133553; G02F 1/13306; G02F 1/133524; G02F 2001/133627; G02F 1/133603; G02F 1/133526; G02F 1/133605; G02F 1/133606; G02F 2001/133607; G03B 21/00; G03B 21/132; G03B 21/2033; G03B 21/10; G03B 21/14; G03B 21/2066; G03B 21/2013; G03B 21/208; G03B 21/2046; G03B 21/28; F21V 5/04; F21V 13/04; F21V 5/02; F21V 7/09; F21Y 2101/02; F21Y 2105/00

USPC ................... 359/631, 727, 457; 345/102, 87; 348/E5.138, E9.027, E5.137, 51, 744, 348/E9.025; 349/5, 6, 62, 65, 57, 67, 179, 349/64, 113, 95, 7, 8; 353/37, 81, 98, 119; 362/327, 555, 561, 602, 97.1, 97.2, 362/97.3, 612, 613, 615, 617, 621, 623, 362/297, 245, 328, 339, 607, 243, 335, 346, 362/560; 313/113

See application file for complete search history.

(56) References Cited

U.S. PATENT DOCUMENTS

| 6,547,400 B1 * | 4/2003 | Yokoyama ...................... 353/98 |
| 7,804,548 B2 * | 9/2010 | Ishii .............................. 348/792 |
| 2006/0158902 A1 * | 7/2006 | De Vaan ........................ 362/622 |
| 2009/0244922 A1 * | 10/2009 | Hayakawa et al. ........... 362/555 |

* cited by examiner

*Primary Examiner* — Thoi Duong
(74) *Attorney, Agent, or Firm* — Novak Druce Connolly Bove + Quigg LLP

(57) ABSTRACT

A projection device includes a light source, a light guiding plate, a liquid crystal device, and a projection lens. The guiding plate aligns with the light source and includes a light incident surface and a light emitting surface facing away from the light incident surface. The light incident surface faces the light source. The liquid crystal device aligns with the light emitting surface. The projection lens is positioned between the liquid crystal device and a screen.

11 Claims, 2 Drawing Sheets

PROJECTION DEVICE

BACKGROUND

1. Technical Field

The present disclosure relates to a projection device.

2. Description of Related Art

Digital light processing (DLP) projectors include a digital micro-mirror device (DMD) for reflecting light to a projection lens for forming images on a screen. At present, a DMD includes about 5,000,000 tiny lenses. While more tiny lenses can improve performance of a DLP projector, the structure of the DLP projector will become more complex.

Therefore, it is desirable to provide a projection device, which can overcome the above-mentioned limitation.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
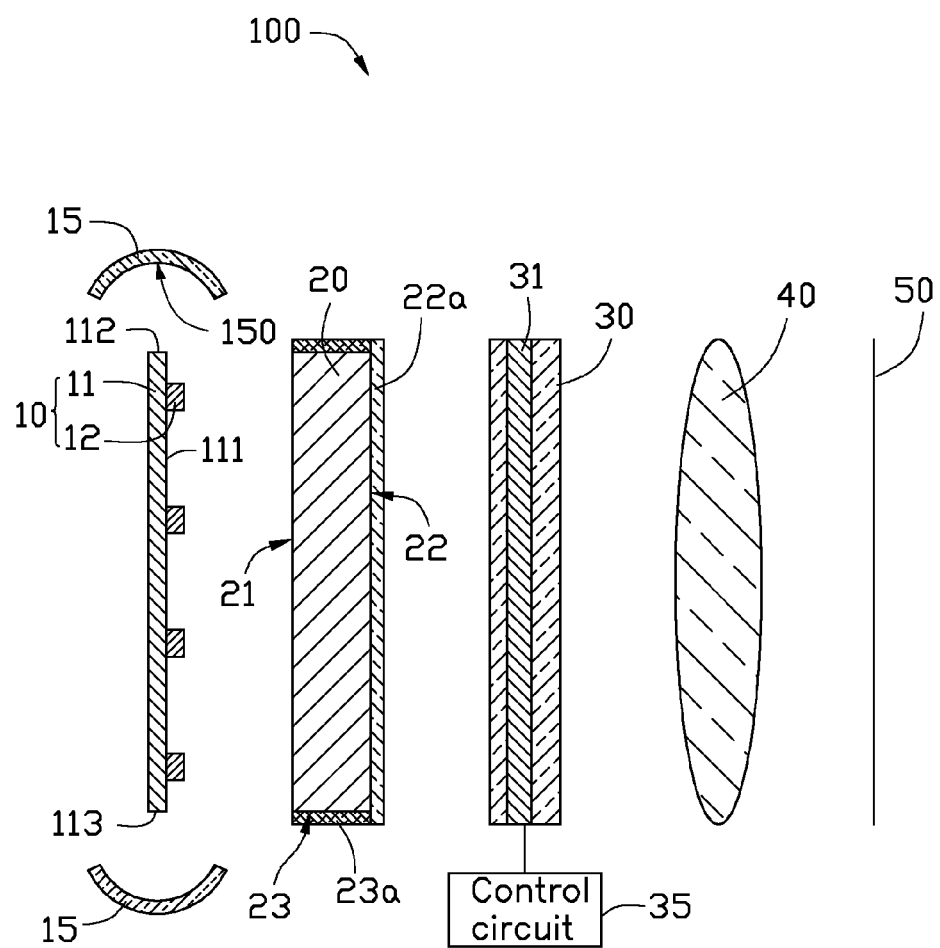
FIG. 1 is a schematic cross-section of a projection device according to a first exemplary embodiment.

FIG. 1 illustrates a projection device 100 according to a first exemplary embodiment. The projector device 100 includes a light source 10, two reflective lenses 15, a light guiding plate 20, a liquid crystal device 30, and a projection lens 40.

The light source 10 includes a substrate 11 and a number of point light sources 12. The substrate 11 is substantially rectangular. The point light sources 12 are light emitting diodes (LEDs) and are orthogonally arrayed on a first surface 111 of the substrate 11. The substrate 11 further includes a second surface 112 and a third surface 113. The first surface 111 is perpendicular to and connected to both the second surface 112 and the third surface 113.

One of the two reflective lenses 15 is positioned above the second surface 112, and the other reflective lens 15 is positioned below the third surface 113. Each of the two reflective lenses 15 includes a curved reflective surface 150. The curved reflective surface 150 faces the second surface 112 or the third surface 113. It should be noted that the number of the reflective lenses 15 is not limited to two, and can be set based on application requirements.

The light guiding plate 20 is aligned with the light source 10 and includes a light incident surface 21, a light emitting surface 22, and two side surfaces 23. The light incident surface 21 faces and is parallel to the first surface 111 of the substrate 11. In the embodiment, the light incident surface 21 and the light emitting surface 22 are also rectangular, the sizes of the light incident surface 21 and the light emitting surface 22 are equal to or smaller than that of the substrate 11. The light emitting surface 22 faces away from and is parallel to the light incident surface 21. The two side surfaces 23 face away from and are substantially parallel to each other. Each of the side surfaces 23 is substantially perpendicular to and connected to both the light incident surface 21 and the light emitting surface 22. Each of the side surfaces 23 is covered by a reflective layer 23a. A transmission layer 22a is positioned on the light emitting surface 22.

The liquid crystal device 30 aligns with the light emitting surface 22 and includes a liquid crystal layer 31. In an initial orientation, the liquid crystal layer 31 allows all light transmitted from the light source 10 to pass through the liquid crystal device 30. When the liquid crystal layer 31 is rotated about 180 degrees from its initial position, all light transmitted from the light source 10 is blocked, and at angles between 0 degrees and 180 degrees proportionate amounts of transmitted light is blocked and the rest passed through. The degree of rotation of the liquid crystal layer 31 is controlled by a control circuit 35.

The projection lens 40 is positioned between the liquid crystal device 30 and a screen 50.

The two reflective lenses 15, the transmission layer 22a, and the reflective layer 23a, which enhance projection brightness may be omitted in other embodiments not requiring such a bright projection light.

Figure 2:
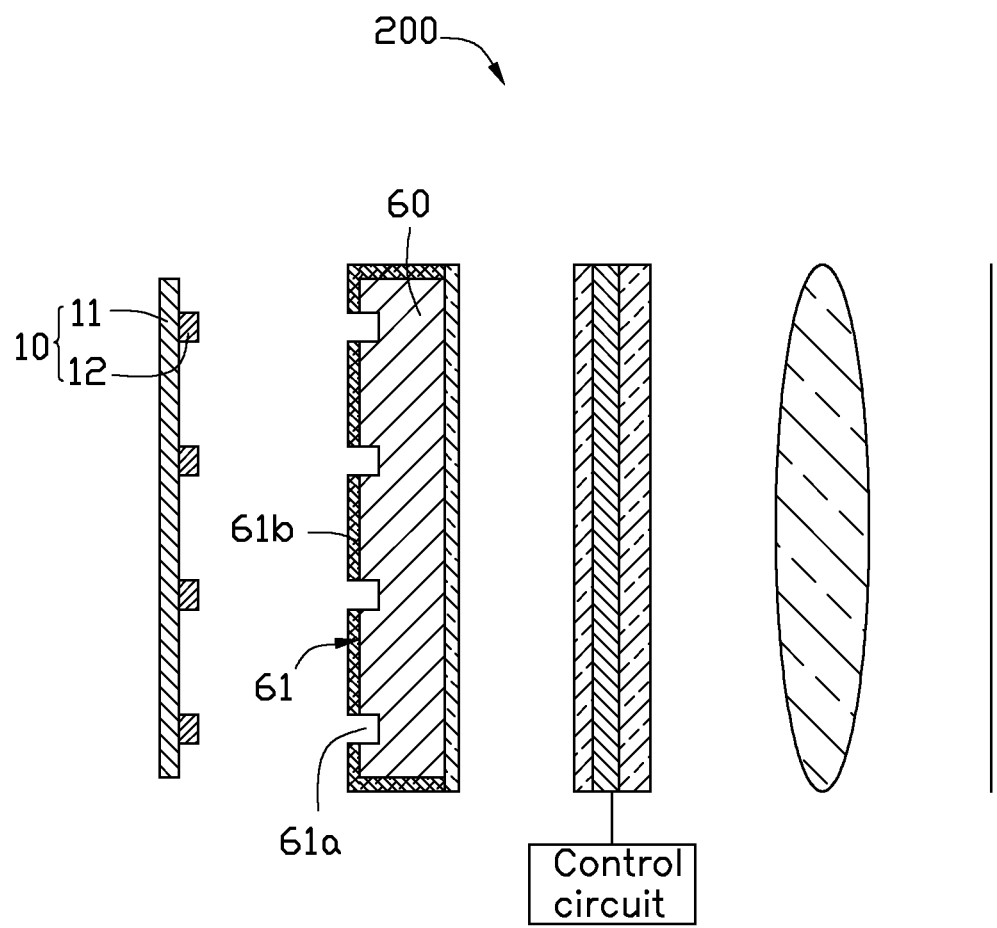
FIG. 2 is a schematic cross-section of a projection device according to a second exemplary embodiment.

FIG. 2 illustrates a projection device 200 in accordance with a second exemplary embodiment. The projection device 200 is essentially similar to the projection device 100 in the first embodiment, except for the inclusion of a light guiding plate 60. In the embodiment, a light incident surface 61 of the guiding plate 60 defines a number of cavities 61a. Each of the cavities 61a receives a respective point light source 12. A reflective layer 61b is also positioned on the light incident surface 61 without covering the cavities 61a. Therefore, the substrate 11 of the light source 10 contacts with the reflective layer 61b and is positioned on the light incident surface 61, and each of the point light sources 12 is received in a respective cavity 61a.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A projection device for projecting an image on a screen, comprising:
    a light source comprising a substrate and a plurality of point light sources arrayed on a first surface of the substrate, the substrate also comprising a second surface and a third surface, the first surface is substantially perpendicular to and connected to both the second surface and the third surface;
    a light guiding plate aligning with the light source, the light guiding plate comprising a light incident surface facing the first surface, and a light emitting surface facing away from the light incident surface, the light incident surface facing the light source;
    a liquid crystal device aligning with the light emitting surface;
    a projection lens positioned between the liquid crystal device and the screen; and
    two reflective lenses, one of the two reflective lenses positioned adjacent to the second surface, and the other reflective lens positioned adjacent to the third surface.

2. The projection device of claim 1, wherein the point light sources are orthogonally arrayed on the first surface of the substrate.

3. The projection device of claim 1, wherein the plurality of point light sources are light emitting diodes.

4. The projection device of claim 1, wherein the substrate is substantially rectangular.

5. The projection device of claim 1, wherein each of the two reflective lenses comprises a curved reflective surface, the curved reflective surface faces the second surface or the third surface.

6. The projection device of claim 1, wherein the sizes of the light incident surface and the light emitting surface are equal to or smaller than the size of the first surface.

7. The projection device of claim 1, wherein the light guiding plate further comprises two side surfaces, the two side surfaces face away from and are substantially parallel to each other, each of the side surfaces is substantially perpendicular to and connected to both the light incident surface and the light emitting surface, each of the side surfaces is covered by a reflective layer.

8. The projection device of claim 7, wherein the light incident surface of the guiding plate defines a plurality of cavities, each of the cavities receives a respective one of the point light sources.

9. The projection device of claim 8, wherein the reflective layer is positioned on the light incident surface without covering the cavities, the substrate contacts with the reflective layer positioned on the light incident surface.

10. The projection device of claim 1, wherein the light guiding plate comprises a transmission layer positioned on the light emitting surface.

11. The projection device of claim 1, wherein the liquid crystal device comprises a liquid crystal layer and a control circuit, a rotation degree of the liquid crystal layer is controlled by the control circuit.

* * * * *